(12) United States Patent
Butters et al.

(10) Patent No.: US 12,481,681 B2
(45) Date of Patent: Nov. 25, 2025

(54) METHODS AND SYSTEMS FOR PROCESSING CONFIGURATION MANAGEMENT DATABASE DATA

(71) Applicant: Barclays Execution Services Limited, London (GB)

(72) Inventors: Tim Butters, London (GB); Steven Elsworth, London (GB)

(73) Assignee: Barclays Execution Services Limited, London (GB)

( * ) Notice: Subject to any disclaimer, the term of this patent is extended or adjusted under 35 U.S.C. 154(b) by 0 days.

(21) Appl. No.: 18/646,423

(22) Filed: Apr. 25, 2024

(65) Prior Publication Data
US 2024/0370468 A1 Nov. 7, 2024

(30) Foreign Application Priority Data
May 2, 2023 (EP) .................................... 23171178

(51) Int. Cl.
*G06F 16/28* (2019.01)
*G06F 16/248* (2019.01)

(52) U.S. Cl.
CPC .......... *G06F 16/288* (2019.01); *G06F 16/248* (2019.01)

(58) Field of Classification Search
CPC ...... G06F 16/288; G06F 16/248; G06F 16/21; H04L 41/12; H04L 41/0853
See application file for complete search history.

(56) References Cited

U.S. PATENT DOCUMENTS

| | | | |
|---|---|---|---|
| 6,105,065 A * | 8/2000 | Rao | H04L 41/046 709/224 |
| 2011/0238691 A1 | 9/2011 | Gere et al. | |
| 2018/0278498 A1 | 9/2018 | Zeng et al. | |
| 2019/0102477 A1 | 4/2019 | Mayers et al. | |
| 2019/0220469 A1 | 7/2019 | Henderson | |

(Continued)

OTHER PUBLICATIONS

Dietrich et al., "Efficient Sink-Reachability Analysis via Graph Reduction," IEEE Transactions on Knowledge and Data Engineering, Nov. 2022, vol. 34, No. 11, pp. 5321-5335.

(Continued)

*Primary Examiner* — Jorge A Casanova
(74) *Attorney, Agent, or Firm* — Wilmer Cutler Pickering Hale and Dorr LLP

(57) ABSTRACT

A computer-implemented method for processing configuration management database data is disclosed. The method comprises acquiring first network data, the first network data representing a configuration management database. The first network data is structured with data comprising: a plurality of nodes, each node representing a configuration item of a plurality of configuration items in the configuration management database, and a plurality of edges connecting the plurality of nodes, each edge representing a relationship between two configuration items represented by the nodes connected by the respective edge. The method further comprises identifying a first node and a second node that are connected indirectly via one or more additional nodes and edges associated with the one or more additional nodes, and establishing, in the first network data, a first condensed edge between the first and second nodes, the first condensed edge connecting directly the first node and the second node.

20 Claims, 9 Drawing Sheets

(56) References Cited

U.S. PATENT DOCUMENTS

2020/0204457 A1* 6/2020 Hu ......................... H04L 41/22
2021/0152433 A1   5/2021 Rimar et al.
2023/0006886 A1* 1/2023 Parashar ............... G06F 3/0482

OTHER PUBLICATIONS

Madduri et al., "A configuration management database architecture in support of IBM Service Management," IBM Systems Journal, published online Jul. 12, 2007, vol. 46, No. 3, pp. 441-457.
The extended European Search Report mailed Oct. 5, 2023, in the European patent application No. 23171178.9. 10 pages.

* cited by examiner

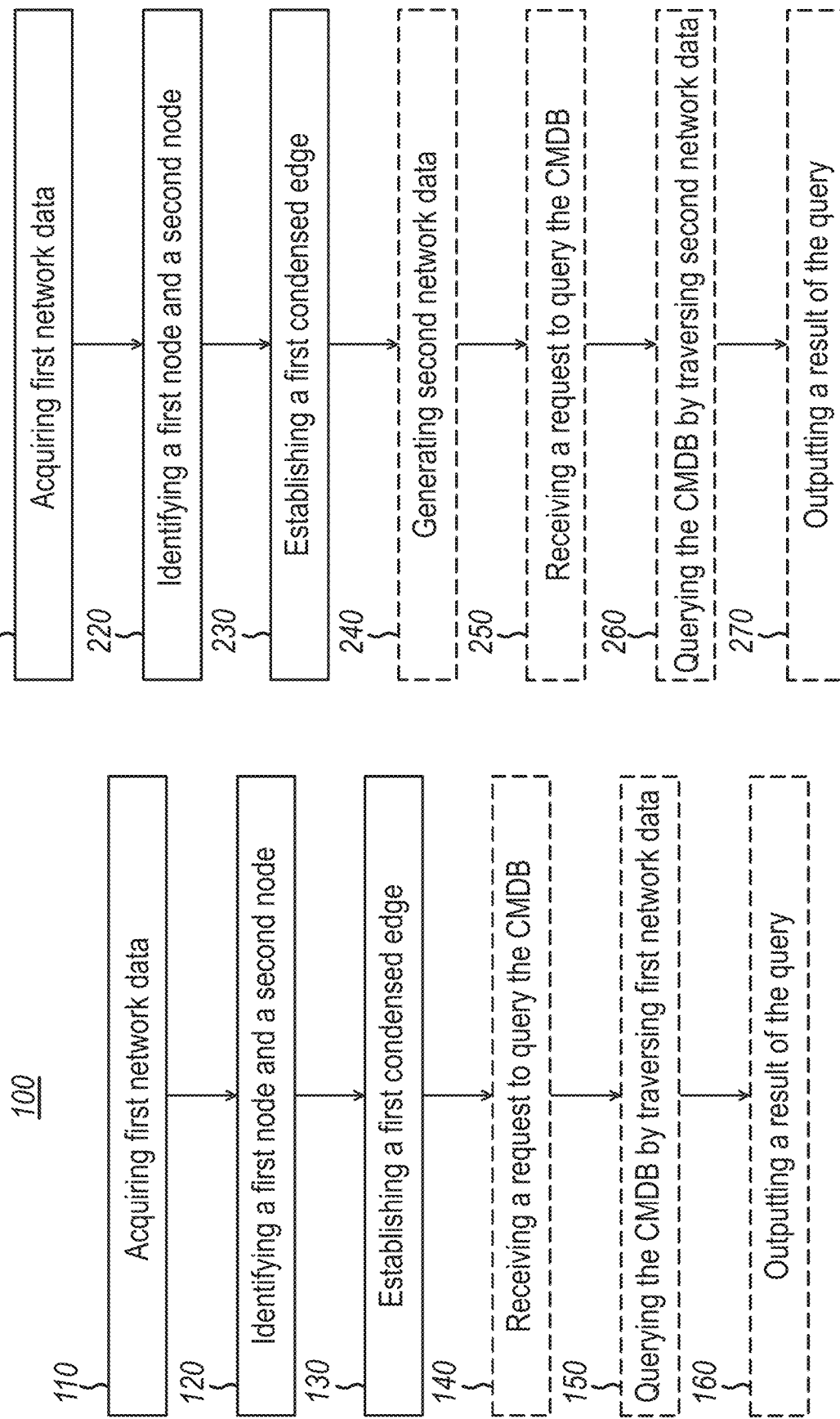

500

METHODS AND SYSTEMS FOR PROCESSING CONFIGURATION MANAGEMENT DATABASE DATA

CROSS-REFERENCE TO RELATED APPLICATIONS

This application claims priority to European Patent Application No. 23171178.9, filed on May 2, 2023, in the European Patent Office, the entire contents of which are incorporated by reference herein in its entirety.

FIELD OF INVENTION

The present invention relates to the field of configuration management databases (CMDBs), in particular methods and systems for processing CMDB data.

BACKGROUND

A configuration management database (CMDB) is a database that stores information about configuration items (CIs) in an IT environment. CIs can be any IT asset that is to be managed, including hardware, software, applications, networks, and services. CMDBs typically contain information about the relationships between CIs, such as which servers are connected to which switches, which applications run on which servers, and which users have access to which applications. This information can be used to manage changes in the IT environment and track the status and availability of CIs.

A CMDB provides a way to understand an organisation's computerised assets and their relationships in terms of data communication flows, and it can be used as a central repository of information for processes such as impact analysis, root cause analysis, incident management, problem management, and change management. By providing a consolidated source of information for assets and their connectivity and relationships, a CMDB can help organisations to improve their IT service delivery. However, querying large CMDB datasets can be time-consuming and resource-intensive, especially when dealing with complex queries that involve multiple data sources.

Currently known frameworks and techniques for managing CMDBs have certain limitations. For example, CMDBs presented in a base tabular format may make it difficult to process simple queries such as "is there a data communication path between configuration item 1 and configuration item 2?" and "which services depend on data from this configuration item?", and practically impossible to process more complex queries such as "what are the communication bottlenecks?" and "are there any data security risk hotspots?". As another example, for ServiceNow, exploration of the CMDB is a slow manual process as there is no straightforward approach to search for connectivity or links between CIs or to combine with other data sources.

SUMMARY OF THE DISCLOSURE

In one aspect of the present disclosure, there is provided a computer-implemented method for processing configuration management database data. The method comprises acquiring first network data, the first network data representing a configuration management database. The first network data is structured with data comprising: a plurality of nodes, each node representing a configuration item of a plurality of configuration items in the configuration management database, and a plurality of edges connecting the plurality of nodes, each edge representing a relationship between two configuration items represented by the nodes connected by the respective edge. The method further comprises: i) identifying, from the plurality of nodes, a first node and a second node that are connected indirectly via one or more additional nodes and edges associated with the one or more additional nodes; and ii) establishing, in the first network data, a first condensed edge between the first node and the second node, wherein the first condensed edge connects directly the first node and the second node.

A configuration item (CI) represents a uniquely identifiable entity in an IT infrastructure, and such entity can be any component that is part of an IT infrastructure that is configurable, and whose status and attributes can be tracked and managed throughout its lifecycle. In the context of the present disclosure, a configuration item in a CMDB can be regarded as configurable data representing an IT entity or an IT asset, such as a server, and a network device, an application, a database, etc. Each CI may have a unique identification number, and its properties and relationships with other CIs are stored in the CMDB. When a CMDB is visualised or presented in a network graph format, each configuration item is represented by a node, and relationships between configuration items are represented by edges connecting the relevant nodes. Each node is typically represented by a symbol or shape, and can be additional attributes such as name and status. Edges are usually represented by lines, and can have attributes such as direction, weight, and type.

By identifying nodes that are indirectly connected and then directly connecting them with a condensed edge, the method enables network data representing the configuration management database to be condensed such that more efficient and effective interrogation of the configuration management database can be performed. In more detail, the interrogation (which may be in the form of a database query) can involve traversing the direct connection that is established between the identified nodes instead of the indirect connections, which means a shorter path of traversal and in turn reduces the time and computer resources required to perform the interrogation.

In some embodiments, the first network data may be further structured with a plurality of hierarchical layers. Each of the plurality of hierarchical layers may represent a category of configuration item, and each of the plurality of nodes may belong to a layer of the plurality of hierarchical layers.

This hierarchical layer structure of the first network data may provide an inherently more efficient way to access data of the configuration management database, for example when compared to a flat or relational database structure. This efficiency can be further enhanced by the proposed method of processing data to condense the data.

In some embodiments, the plurality of hierarchical layers may comprise a first layer and a second layer, and the one or more additional nodes may comprise a third node and a fourth node. In these embodiments, the first node and the second node may belong to the first layer, and the third node and the fourth node may belong to the second layer. Nodes in the second layer may be child nodes of nodes in the first layer.

Furthermore, in these embodiments, the plurality of hierarchical layers may further comprise a third layer, the nodes in the third layer being child nodes of nodes in the second layer. Alternatively, in these embodiments, the nodes in the third layer may be parent nodes of nodes in the first layer.

In some embodiments, the method may further comprise receiving a request to condense the first network data at the first layer. In these embodiments, steps i) and ii) may be performed in response to receiving the request to condense the first network data at the first layer.

In this way, the processing of the CMDB data to condense the first network data may be performed upon request, for example from a user via a user interface. The option to initiate processing of the CMDB data upon user request provides greater flexibility, customisation, and control over the process, while potentially conserving computing resources.

In some embodiments, the method may further comprise receiving a request to determine a shortest path between the first and second nodes. In these embodiments, identifying the first node and the second node may comprise determining that the first node and the second node are connected indirectly in response to a receiving the request to determine a shortest path between the first and second nodes. Furthermore, the request may be received via a user interface.

In this way, the identification of the first and second nodes in the first network data may involve determining, and thus confirming, an indirect connection between the first and second nodes. In addition, the identification of the first and second nodes can be triggered by receiving a specific request to determine a shortest path between the two nodes.

In some embodiments, the method may further comprise flagging the first condensed edge with a flag indicating that the first condensed edge is to be preferred to any other edge in the first network data.

In this way, the first condensed edge can be prioritised during interrogation of the CMDB, which ensures that the shortest path between the first and second noes is traversed, hence minimising the time and computer resources required for the interrogation.

In some embodiments, the method may further comprise, subsequent to establishing the first condensed edge, identifying one or more pairs of nodes from the plurality of nodes in the first network data, wherein the one or more pairs of nodes each include two nodes that are connected indirectly via one or more additional nodes and edges associated with the one or more additional nodes; and establishing, in the first network data, a condensed edge between the two respective nodes for each identified pair of nodes, wherein the condensed edge connects directly the two respective nodes.

In this way, further pairs of nodes that are connected indirectly in the first network data can be identified and subsequently connected directly with respective condensed edges in the first network data. The more condensed edges are established, the higher the likelihood that a query of the CMDB can be processed more efficiently in terms of time and computing resources, since query of the CMDB would more likely involve traversing the condensed edges rather than the edges that indirectly connect the nodes.

In some embodiments, the method may further comprise, subsequent to establishing the first condensed edge, generating second network data representative of the configuration management database. The second network data may be structured with data comprising the first node, the second node, and the first condensed edge, and the first node and the second node may only be connected by the first condensed edge in the second network data.

By generating second network data which represents the CMDB, a new representative structure that only includes condensed edges (and potentially edges that directly connect nodes in a given layer) can be used for processing queries of the CMDB. This ensures that processing of queries of the CMDB only involves traversal the most efficient paths between nodes, thereby maximising the efficiency of query processing in terms of time and computing resources.

In some embodiments, the method may further comprise, subsequent to establishing the first condensed edge, receiving a request to query the configuration management database, optionally via a user interface; querying the configuration management database by traversing network data representing the configuration management database; and outputting a result of the query.

As mentioned above, by processing a request to query the CMDB by traversing network data (which may be the first network data, the second network data, or both), the interrogation of the CMDB can involve traversal of condensed edges rather than edges that indirectly connect nodes. This improves the efficiency of the interrogation of the CMDB.

In some embodiments, traversing network data representing the configuration management database may comprise traversing at least one of the first network data and the second network data. In embodiments where querying the configuration management database comprises traversing at least the first network data, traversing the first network data may comprise traversing the flagged first condensed edge in preference to other edges in the first network data.

This ensures that the shortest path between the first and second nodes is traversed during interrogation of the CMDB, hence minimising the time and computer resources required for the interrogation or query.

In some embodiments, the request to query the configuration management database may be one of: a request to identify the fewest number of edges between two given nodes, a request to determine whether at least one given node is directly or indirectly connected to a different given node, a request to determine whether a particular relationship type exists between two given nodes, a request to identify one or more nodes which are directly or indirectly connected to both of two different given nodes, a request to identify and list, optionally in order, the nodes having the greatest number of edges, a request to identify one or more nodes with a number of edges exceeding a threshold, and a request to identify all nodes directly or indirectly connected to a given node.

In some embodiments, the result may comprise the nodes and edges relevant to the query, and the result may be output as at least one of: a graph representation, a force-directed graph drawing, a matrix representation, a radial tree diagram, and a table.

Outputting results in a graphical format such as a graph representation, a force-directed graph drawing, a matrix representation, a radial tree diagram, etc. may be helpful for visualising the relationships and dependencies between CIs, and for identifying potential issues or bottlenecks in the IT environment.

In some embodiments, the configuration management database may represent a distributed computing infrastructure. In these embodiments, a relationship between two configuration items may represent an operational link between two components of the distributed computing infrastructure. Furthermore, a relationship between two configuration items may comprise at least one of: stored on, stores, hosted on, hosts, connects to, connected by, contains, contained by, defines resources for, gets resources from, depends on, used by, manages, managed by, members, member of, owns, owned by, runs on, runs, one-way data transfer, two-way data transfer, API call to, and API calls.

In some embodiments, each configuration item may be configurable data representative of one of: a hardware item, a software item, a network, a location, a document, and a computerised service.

In another aspect of the present disclosure, there is provided a system for processing configuration management database data. The system comprises: an acquiring unit configured to receive first network data, the first network data representing a configuration management database. The first network data is structured with data comprising: a plurality of nodes, each node representing a configuration item of a plurality of configuration items in the configuration management database, and a plurality of edges connecting the plurality of nodes, each edge representing a relationship between two configuration items represented by the nodes connected by the respective edge. The system further comprises an identifying unit configured to identify, from the plurality of nodes, a first node and a second node that are connected indirectly via one or more additional nodes and edges associated with the one or more additional nodes, and an establishing unit configured to establish, in the first network data, a first condensed edge between the first node and the second node, the first condensed edge connecting directly the first node and the second node.

In another aspect of the present disclosure, there is provided a cloud computing environment system comprising the system as described herein.

In another aspect of the present disclosure, there is provided computer hardware configured to implement the system as described herein, the method as describe herein, or the cloud computing environment system as described herein.

In another aspect of the present disclosure, there is provided a computer program comprising instructions which, when the program is executed by a computer, cause the computer to carry out the steps of the method as described herein.

In another aspect of the present disclosure, there is provided a computer-readable data carrier having stored thereon the computer program as described herein.

BRIEF DESCRIPTION OF FIGURES

The present disclosure is described with reference to the accompanying figures, in which:

FIG. 1 is a flow diagram of a computer-implemented method for processing configuration management database data, according to the present disclosure.

FIG. 2 is a flow diagram of a computer-implemented method for processing configuration management database data, according to the present disclosure.

DETAILED DESCRIPTION

Figure 3:
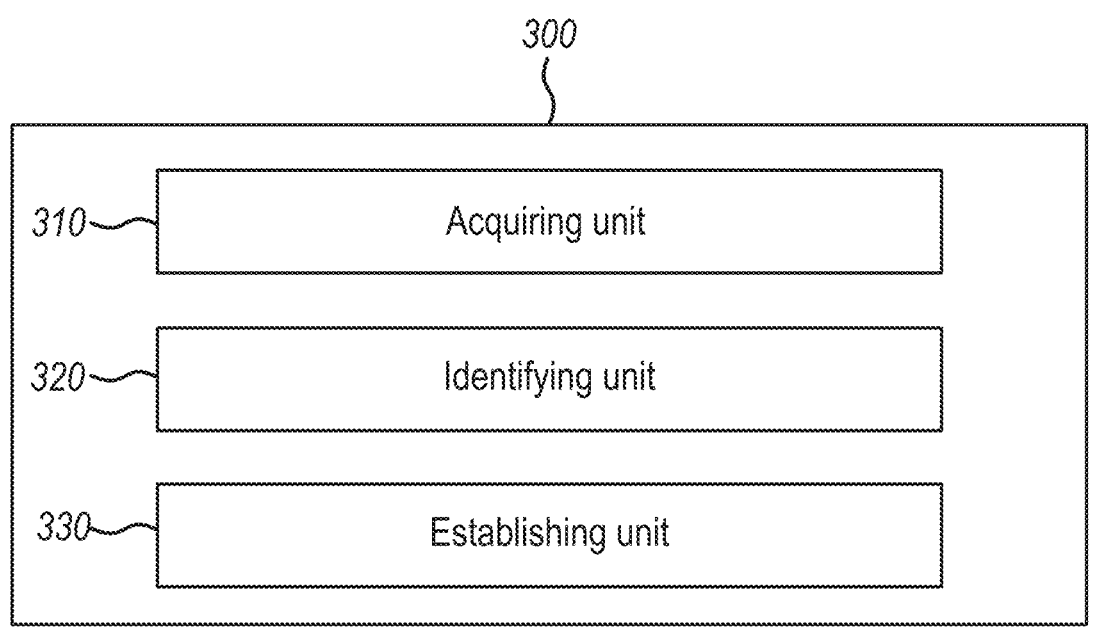
FIG. 3 is a block diagram of a system for processing configuration management database data, according to the present disclosure.

The present invention is described in detail below by way of example only.

In a configuration management database (CMDB), for organisations with a large number of computerised and interconnected assets, it is desirable to determine the data and communication flow interdependencies between assets. In some cases, each asset is represented in the database by a node, and relationships between assets are represented by edges. Assets are often connected indirectly with numerous intervening assets between two end nodes. By representing the CMDB as a network graph, related services within an IT infrastructure can be identified, links between configuration items can be queried, and reachable configuration items from a given start point can be found. When combined with external data, the network graph format of CMDB representation can enable services using out-of-date software to be identified within the IT infrastructure and changes in hardware behaviour to be profiled, and in turn potentially impacted services can be alerted. Moreover, by performing network analysis, the "blast radius" of CI degradation (i.e. the volume of other services impacted, if the CI service/component fails) can be calculated, risk hotspots can be identified based on connection metrics. Furthermore, pattern analysis of infrastructure can be performed for comparison. For example, the architecture of two services or the infrastructure of two instances (e.g. a live instance and a backup instance) of a service can be compared. As a more specific example, it may be useful to compare a live instance and a backup instance (which can be activated if the live instance fails) to ensure that they are similar and that the backup instance is suitable and appropriate for the purpose of service recovery.

It is desirable to condense the data representing the CMDB to remove intervening assets and provide for more efficient interrogation of the CMDB. The proposed methods for processing configuration management database data achieve this by identifying two nodes that are connected indirectly and generating a single edge that connects the two nodes in place of the indirect edge connections. As a result, processes such as incident management and problem management can be made more efficient and robust.

To illustrate with an example of incident management, for instance there may be a major incident on service A within the IT infrastructure. In this example, it may be desirable to determine whether emerging incidents on other services X, Y, and Z within the same IT infrastructure are related to the incident on service A. In case the server of service A requires a restart, it may also be desirable to determine which other services utilise the same server. By condensing connections between nodes (which represent CIs) in the network data representing the CMDB, queries such as "is the emerging incident on service X related to the incident on service A?" and "which other services utilise the server of service A?" can be performed more efficiently, since the number of nodes traversed in the network data for these queries would be minimised.

To illustrate with an example of problem management, for instance it may be desirable to determine whether there is a data dependency between service A and database X, or to determine what CIs are shared between service A and service B, so as to identify the underlying causes of recurring incidents or problems. By analysing the connections, dependencies, and/or associations between CIs in the CMDB, potential sources of issues (e.g. hardware failures, network connectivity issues, capacity issues, etc.) can be identified, and targeted solutions can be developed to address these issues. The queries such as "is there a dependency between service A and database X" and "what CIs can be shared between service A and service B?" can be answered in an efficient manner by traversing condensed network data structure achieved by the proposed methods and systems herein.

Furthermore, other processes such as user journey mapping in an IT environment (i.e. an automated way to map and visualise links between systems in the organisation) and the identification of low critically systems underpinning certain services within the IT infrastructure can be performed more effectively using a condensed network data structure achieved by the methods and systems proposed herein, thus alleviating a large amount of manual effort. Simpler queries such as "is there a path between configuration item 1 and configuration item 2?" and "which services depend on this configuration item?" can be answered by traversing the condensed network data structure, and even more complex queries such as "what are the bottlenecks?" and "are there any risk hotspots?" which would have been practically impossible to answer with base tabular format of CMDB can also be answered using the condensed network data structure.

FIG. 1 is a flow diagram of a computer-implemented method for processing configuration management database (CMDB) data, according to the present disclosure.

The computer-implemented method 100 begins with step 110 at which first network data representing a configuration management database (CMDB) is acquired. The first network is structured with data comprising a plurality of nodes and a plurality of edges connecting the plurality of nodes. In the context of the present disclosure, "network data" refers to data of a network graph (which is also known as a "force directed diagram" or a "network diagram"). Hence, "network data" may be referred to as "force directed diagram data", "network graph data", or "network diagram data".

Each of the plurality of nodes represents a configuration item (CI) of a plurality of configuration items in the CMDB. Each of the plurality of edges represents a relationship between two configuration items represented by the nodes connected by the respective edge. Each CI is configurable data which may be representative of one of: a hardware item, a software item, a network, a document, and a computerised service. As will be explained in more detail below, each of these may be regarded as a "category" type of CI.

A relationship between CIs can be represented by a set of attributes that define the nature of the relationship, such as a relationship type (e.g. a type of connection, such as a network connection or a database connection), a relationship direction (e.g. one-way or bidirectional), a relationship status (e.g. active or inactive), etc. A relationship between CIs may be at least one of: a parent-child relationship, a dependency relationship, an association relationship, and a triggering relationship. A parent-child relationship represents a hierarchy between respective configuration items, where one configuration item is considered the "parent" and the other configuration item is considered the "child". For example, a server may be the "parent" of a plurality of virtual machines, which are regarded as its "children". A dependency relationship represents a dependency between configuration items, where one configuration item relies on the other configuration item to function properly. For example, a database server may depend on a memory store to store data. An association relationship represents a general association between configuration items which is not necessarily a dependency. For example, a user device may be associated with a printing device, but the printing device is not required by the user device to function properly. A triggering relationship represents a cause-and-effect relationship between configuration items, where one configuration item may trigger an event or action at another configuration item. For example, a change in configuration of a server may trigger an update to a database.

The CMDB may represent a distributed computing infrastructure in some embodiments. In these embodiments, a relationship between two configuration items may represent an operational link between two components of the distributed computing infrastructure. Furthermore, a relationship between two configuration items may comprise at least one of: stored on, stores, hosted on, hosts, connects to, connected by, contains, contained by, defines resources for, gets resources from, depends on, used by, manages, managed by, members, member of, owns, owned by, runs on, runs, one-way data transfer, two-way data transfer, Application Programming Interface (API) call to, and API calls. Each configuration item may be configurable data representative of one of: a hardware item, a software item, a network, a document, and a computerised service.

The CMDB can be regarded as a hierarchical layer database, which is a type of database model where data is organised in a tree-like structure including multiple layers of parent-child relationships. In such database model, data is represented in a series of layers, where each layer contains a subset of data related to the layer above it. The topmost layer of the database (sometimes referred to as a the "root layer") represents the entire database. The next layer may contain subsets of data related to the root layer, and subsequent layers contain further subsets of data related to the layer above it. Thus, the first network data may be further structured with a plurality of hierarchical layers, each of the plurality of hierarchical layers representing a category of configuration item. In these embodiments, each node of the CMDB belong to a layer of the plurality of hierarchical layers. In some cases, the hierarchical layer structure may provide a more efficient way to access data compared to a flat or relational database structure. The hierarchical layer structure will be explained by an example with respect to FIG. 5 below.

As mentioned above, a category of configuration item may be one of: a hardware item, a software item, a network, a document, and a computerised service. A hardware item may be a physical device such as a server, a desktop computer, a network device (e.g. a router), a storage device, etc. Examples of software items include an operating system, an application, a database, etc. A "network" configuration item may represent a network as a whole, including its topology, devices, connections, and/or configurations. A document may be documentation related to CIs, such as manuals, user guides, policies, procedures, etc. Examples of computerised services include email, web hosting, network connectivity, and other services that can be provided by an IT department in an organisation.

Returning to FIG. 1, at step 120, a first node and a second node are identified, the first node and the second node being connected indirectly via one or more additional nodes and edges associated with the one or more additional nodes.

The method may further comprise receiving a request to determine a shortest path between the first and second nodes. In these embodiments, identifying the first node and the second node at step 120 may comprise determining that the first node and the second node are connected indirectly, in response to receiving this request. The request to determine a shortest path between the first and second nodes may be received via a user interface.

Subsequently, at step 130, a first condensed edge that connects directly the first node and the second node is established in the first network data.

As mentioned above, the first network data may be further structured with a plurality of hierarchical layers, each hierarchical layer (which may be simply referred to as "layer" herein) representing a category of configuration item, and each node of the first network data belonging to a layer. In these embodiments, the hierarchical layers may comprise a first layer and a second layer, and the first node and the second node may belong to the first layer. Also, in these embodiments, the one or more additional nodes may comprise a third node and a fourth node, the third and fourth nodes belong to the second layer. Furthermore, in these embodiments, nodes in the second layer may be child nodes of nodes in the first layer. The plurality of hierarchical layers may further comprise a third layer, the nodes in the third layer being child nodes of nodes in the second layer or parent nodes of nodes in the first layer. In embodiments where the plurality of hierarchical layers comprises a third layer, steps 120 and 130 may be performed in response to receiving a request to condense the first network data at the first layer.

Although not illustrated in FIG. 1, subsequent to step 130, the method may further comprise identifying one or more pairs of nodes from the plurality of nodes in the first network data, the one or more pairs of nodes each including two nodes that are connected indirectly via one or more respective additional nodes and edges associated with the one or more respective additional nodes, and establishing, in the first network data, a respective condensed edge between the two respective nodes for each identified pair of nodes, the condensed edge connecting directly the two respective nodes. Accordingly, more pairs of nodes that are each indirectly connected to another node in the first network data may be identified and then directly connected with a new respective condensed edge. These steps further condense the structure of the first network data and in turn increases the efficiency of query processing of the CMDB.

Returning to FIG. 1, after the first condensed edge is established at step 130, the method may proceed to optional step 140 at which a request to query the CMDB is received. In this case, the method may then proceed to optional step 150 at which the CMDB is queried by traversing the first network data, and optional step 160 at which a result of the query may be output. The optional method steps are illustrated in FIG. 1 using dotted line boxes instead of solid line boxes.

At step 140, the request to query the CMDB may be received via a user interface. Furthermore, the request may be one of: a request to identify the fewest number of edges between two given nodes, a request to determine whether at least one given node is directly or indirectly connected to a different given node, a request to determine whether a particular relationship type exists between two given nodes, a request to identify one or more nodes which are directly or indirectly connected to both of two different given nodes, a request to identify and list, optionally in order, the nodes having the greatest number of edges, a request to identify one or more nodes with a number of edges exceeding a threshold, and a request to identify all nodes directly or indirectly connected to a given node.

At step 150, traversing the first network data means that the structure of the first network data is navigated by following the relationships (edges) and moving from one node to another node to find all the nodes (representing CIs) that are connected directly or indirectly to identify dependencies between the CIs and their impact on other CIs.

Although not illustrated in FIG. 1, the method 100 may further comprise flagging the first condensed edge with a flag indicating that the first condensed edge is to be preferred to any other edge in the first network data. In these embodiments, traversing the first network data at optional step 150 may comprise traversing the flagged first condensed edge in preference to other edges in the first network data.

At step 160, the outputted result may comprise the nodes and edges relevant to the query and may be configured as at least one of: a graph representation, a force-directed graph drawing, a matrix representation, a radial tree diagram, and a table. Results presented in a graphical format (such as a network diagram or topology map) can be helpful for visualising the relationships and dependencies between CIs, and for identifying potential issues or bottlenecks in the IT environment. Results presented in a table format (e.g. where each row represents a CI and each column represents a different attribute or property of the CI) can make it easier to sort and filter the results and to compare different CIs based on their attributes.

As an example, the query "which configuration item has the most neighbours?" may return results in the form of two tables, where the first table includes results from a full condensed network data structure and the second table includes results from a condensed service network data structure. In each table, each row represents a configuration item, and each table can further include a first column representing the name of the configuration item, a second column representing the class of the configuration item (e.g. "load balancer pool" and "IT business service"), and a third column representing the score of the configuration item, where the score is indicative of a number of neighbours of the respective configuration item, where "neighbours" in this context refer to the CI-representing nodes that are directly connected to the node representing the configuration item in question. The tables can be provided such that the configuration items in the table are ranked, with the configuration item having the most neighbours at the top and the configuration item having the least neighbours at the bottom.

As another example, the query "which configuration item is the most 'important'?" may return results in the form of two tables, where the first table includes results from a full condensed network data structure and the second table includes results from a condensed service network data structure. Similar to the example described above, in each table each row represents a configuration item, and each table can further include a first column representing the name of the configuration item, a second column representing the class of the configuration item (e.g. "Teradata instance", "cluster", "IT service instance"), and a third column representing the score of the configuration item, where the score is indicative of a degree of "importance", which in this context refers to a level of impact to the other configuration items (e.g. how many other configuration items would be impacted) if the respective configuration item fails). In some cases, the degree of importance may also take into account whether the other configuration items that would be impacted are high-priority configuration items. The tables can be provided such that the configuration items in the table are ranked, with the configuration item having the highest score of "importance" at the top and the configuration item having the lowest score at the bottom.

Although not illustrated in FIG. 1, subsequent to step 130, the method may further comprise generating second network data representative of the CMDB. The second network data may be structured with data comprising the identified first and second nodes and the first condensed edge, and in the second network data the first node and second node are only connected by the first condensed edge.

FIG. 2 is a flow diagram of a computer-implemented method for processing configuration management database (CMDB) data, according to the present disclosure.

The computer-implemented method 200 includes steps 210, 220, and 230, which are the same as steps 110, 120, and 130 of method 100 as illustrated in FIG. 1. Therefore, description for these method steps will not be repeated here but it should be understood that the description of steps 110, 120, and 130 as provided above apply to steps 210, 220, and 230 of method 200 as illustrated in FIG. 2.

Subsequent to step 230, the method may optionally proceed to step 240 at which second network data is generated. Similar to the first network data, the second network data is representative of the configuration management database. However, different from the first network data, the second network data is structured with data comprising the first node and the second node (which have been identified in step 220) and the first condensed edge, the first and second nodes only being connected by the first condensed edge and not the one or more additional nodes and edges that connect the two nodes in the first network data.

The method may then proceed to step 250 at which a request to query the CMDB is received. The CMDB may then be queried by traversing the second network data at optional step 260. Subsequently, at optional step 270 a result of the query may be output.

Similar to step 140, the request to query the CMDB may be received at step 250 via a user interface. Furthermore, the request may be one of: a request to identify the fewest number of edges between two given nodes, a request to determine whether at least one given node is directly or indirectly connected to a different given node, a request to determine whether a particular relationship type exists between two given nodes, a request to identify one or more nodes which are directly or indirectly connected to both of two different given nodes, a request to identify and list, optionally in order, the nodes having the greatest number of edges, a request to identify one or more nodes with a number of edges exceeding a threshold, and a request to identify all nodes directly or indirectly connected to a given node.

At step 260, traversing the second network data means that the structure of the second network data is navigated by following the relationships (edges) and moving from one node to another node to find all the nodes (representing CIs) that are connected to identify dependencies between the CIs and their impact on other CIs.

Similar to step 160, the result outputted at step 270 may comprise the nodes and edges relevant to the query and may be configured as at least one of: a graph representation, a force-directed graph drawing, a matrix representation, a radial tree diagram, and a table. Results presented in a graphical format (such as a network diagram or topology map) can be helpful for visualising the relationships and dependencies between CIs, and for identifying potential issues or bottlenecks in the infrastructure. Results presented in a table format (e.g. where each row represents a CI and each column represents a different attribute or property of the CI) can make it easier to sort and filter the results and to compare different CIs based on their attributes.

Although not illustrated in FIG. 2, subsequent to step 230, the method may further comprise identifying one or more pairs of nodes from the plurality of nodes in the first network data, the one or more pairs of nodes each including two nodes that are connected indirectly via one or more respective additional nodes and edges associated with the one or more respective additional nodes. In these embodiments, the method may also further comprise establishing, in the first network data, a respective condensed edge between the two respective nodes for each identified pair of nodes, the condensed edge connecting directly the two respective nodes. Alternatively, or in addition, in these embodiments the second network data generated at step 240 may further comprise the identified one or more pairs of nodes and the respective condensed edges, where each of the one or more pairs of nodes are only connected by a respective condensed edge. In addition, the second network data generated at step 240 may further comprise one or more pairs of nodes that are already directly connected in the first network data acquired at step 210.

It is understood that although FIG. 1 and FIG. 2 respectively illustrate methods in which the first network data is traversed during the step of querying the CMDB and the second network data is traversed during the step of querying the CMDB, it is possible for both the first network data and the second network data to be available for traversal during the querying of the CMDB in other embodiments. In other words, it is to traverse the first network data or the second network data, or both.

FIG. 3 is a block diagram of a system for processing configuration management database data, according to the present disclosure.

As shown in FIG. 3, the system 300 comprises an acquiring unit 310, an identifying unit 320, and an establishing unit 330. The acquiring unit 310 is configured to acquire first network data. The first network data represents a configuration management database, and is structured with data comprising a plurality of nodes and a plurality of edges. Each of the plurality of nodes represents a configuration item (CI) of a plurality of configuration items in the CMDB. Each of the plurality of edges represents a relationship between two configuration items represented by the nodes connected by the respective edge. Each CI is configurable data that may be representative of one of: a hardware item, a software item, a network, a document, and a computerised service, and a person. As will be explained in more detail below, each of these may be regarded as a "category" type of CI.

A relationship between CIs can be represented by a set of attributes that define the nature of the relationship, such as a relationship type (e.g. a type of connection, such as a network connection or a database connection), a relationship direction (e.g. one-way or bidirectional), a relationship status (e.g. active or inactive), etc. A relationship between CIs may be at least one of: a parent-child relationship, a dependency relationship, an association relationship, and a triggering relationship. A parent-child relationship represents a hierarchy between respective configuration items, where one configuration item is considered the "parent" and the other configuration item is considered the "child". For example, a server may be the "parent" of a plurality of virtual machines, which are regarded as its "children". A dependency relationship represents a dependency between configuration items, where one configuration item relies on the other configuration item to function properly. For example, a database server may depend on a memory store to store data. An association relationship represents a general association between configuration items which is not necessarily a dependency. For example, a user device may be associated with a printing device, but the printing device is not required by the user device to function properly. A triggering relationship represents a cause-and-effect relationship between configuration items, where one configuration item may trigger an event or action at another configuration item. For example, a change in configuration of a server may trigger an update to a database.

The CMDB may represent a distributed computing infrastructure in some embodiments. In these embodiments, a relationship between two configuration items may represent an operational link between two components of the distributed computing infrastructure. Furthermore, a relationship between two configuration items may comprise at least one of: stored on, stores, hosted on, hosts, connects to, connected by, contains, contained by, defines resources for, gets resources from, depends on, used by, manages, managed by, members, member of, owns, owned by, runs on, runs, one-way data transfer, two-way data transfer, Application Programming Interface (API) call to, and API calls. Each configuration item may be configurable data representative of one of: a hardware item, a software item, a network, a document, and a computerised service.

The CMDB can be regarded as a hierarchical layer database, which is a type of database model where data is organised in a tree-like structure including multiple layers of parent-child relationships. In this database model, data may be represented in a series of layers, where each layer contains a subset of data related to the layer above it. The topmost layer of the database may be referred to as a the "root layer", which represents the entire database. The next layer may contain subsets of data related to the root layer, and subsequent layers contain further subsets of data related to the layer above it. Thus, the first network data may be further structured with a plurality of hierarchical layers, each of the plurality of hierarchical layers representing a category of configuration item. In these embodiments, each node of the CMDB belong to a layer of the plurality of hierarchical layers. In some cases, the hierarchical layer structure may provide a more efficient way to access data compared to a flat or relational structure. The hierarchical layer structure will be explained by an example with respect to FIG. 5 below.

As mentioned above, a category of configuration item may be one of: a hardware item, a software item, a network, a location, a document, and a computerised service. A hardware item may be a physical device such as a server, a desktop computer, a network device (e.g. a router), a storage device, etc. Examples of software items include an operating system, an application, a database, etc. A "network" configuration item may represent a network as a whole, including its topology, devices, connections, and/or configurations. A document may be documentation related to CIs, such as manuals, user guides, policies, procedures, etc. stored in a digital format. Examples of computerised services include email, web hosting, network connectivity, and other services that can be provided by an IT department in an organisation.

The identifying unit 320 is configured to identify, from the plurality of nodes, a first node and a second node that are connected indirectly via one or more additional nodes and edges associated with the one or more additional nodes.

Although not illustrated in FIG. 3, the system 300 may further comprise a receiving unit configured to receive a request to determine a shortest path between the first and second nodes. In these embodiments, the identifying unit 320 may be configured to identify the first node and the second node at step 120 by determining that the first node and the second node are connected indirectly, in response to the receiving unit receiving this request. The request to determine a shortest path between the first and second nodes may be received by the receiving unit via a user interface. In these embodiments, the receiving unit may be the user interface.

The establishing unit 330 is configured to establish, in the first network data, a first condensed edge between the first node and the second node. The first condensed edge connects directly the first node and the second node.

As mentioned above, the first network data may be further structured with a plurality of hierarchical layers, each hierarchical layer (which may be simply referred to as "layer" herein) representing a category of configuration item, and each node of the first network data belonging to a layer. In these embodiments, the hierarchical layers may comprise a first layer and a second layer, and the first node and the second node may belong to the first layer. Also, in these embodiments, the one or more additional nodes may comprise a third node and a fourth node, the third and fourth nodes belong to the second layer. Furthermore, in these embodiments, nodes in the second layer may be child nodes of nodes in the first layer. The plurality of hierarchical layers may further comprise a third layer, the nodes in the third layer being child nodes of nodes in the second layer or parent nodes of nodes in the first layer. In embodiments where the plurality of hierarchical layers comprises a third layer, the system 300 may further comprise a receiving unit configured to receive a request to condense the first network data at the first layer, and the identifying unit 320 and the establishing unit 330 may be configured to perform their respective functionalities (i.e. to identify the first and second nodes and to establish the first condensed edge) in response to the receiving unit receiving such request.

Although not illustrated in FIG. 3, the system 300 may further comprise a generating unit configured to generate second network data representative of the CMDB. The second network data may be structured with data comprising the identified first and second nodes and the first condensed edge, and in the second network data the first node and second node are only connected by the first condensed edge.

The identifying unit 320 may be further configured to identify one or more pairs of nodes from the plurality of nodes in the first network data, the one or more pairs of nodes each including two nodes that are connected indirectly via one or more respective additional nodes and edges associated with the one or more respective additional nodes. In these embodiments, the establishing unit 330 may be further configured to establish, in the first network data, a respective condensed edge between the two respective nodes for each identified pair of nodes, the condensed edge connecting directly the two respective nodes. Alternatively, or in addition, in these embodiments the system 300 may comprise a generating unit configured to generate second network data, as explained in the paragraph above, and the generated second network data may further comprise the identified one or more pairs of nodes and the respective condensed edges, where each of the one or more pairs of nodes are only connected by a respective condensed edge in the second network data. Moreover, the generated second network data may further comprise one or more pairs of nodes that are already directly connected in the first network data acquired by the acquiring unit 310.

Although not illustrated in FIG. 3, the system 300 may further comprise: a receiving unit configured to receive a request to query the CMDB after the establishing unit 330 has established the first condensed edge, a querying unit configured to query the CMDB by traversing network data (i.e. the first network data and/or the second network data), and an outputting unit configured to output the result of the query. The request may be one of: a request to identify the fewest number of edges between two given nodes, a request to determine whether at least one given node is directly or indirectly connected to a different given node, a request to determine whether a particular relationship type exists between two given nodes, a request to identify one or more nodes which are directly or indirectly connected to both of two different given nodes, a request to identify and list, optionally in order, the nodes having the greatest number of edges, a request to identify one or more nodes with a number of edges exceeding a threshold, and a request to identify all nodes directly or indirectly connected to a given node.

The receiving unit may be configured to receive the request to query the CMDB via a user interface. Also, the receiving unit may be the user interface.

To explain the functionality of the querying unit in more detail, it may be configured to traverse network data by following the relationships (edges) and moving from one node to another node to find all the nodes (which represent CIs) that are connected directly or indirectly to identify dependencies between the CIs and their impact on other CIs.

Although not illustrated in FIG. 3, the system 300 may further comprise a flagging unit configured to flag the first condensed edge with a flag indicating that the first condensed edge is to be preferred to any other edge in the first network data. In these embodiments, the querying unit may be configured to traverse the first network data such that the flagged first condensed edge is traversed in preference to other edges in the first network data.

The outputted result by the outputting unit may comprise the nodes and edges relevant to the query and may be configured as at least one of: a graph representation, a force-directed graph drawing, a matrix representation, a radial tree diagram, and a table.

Figure 4:
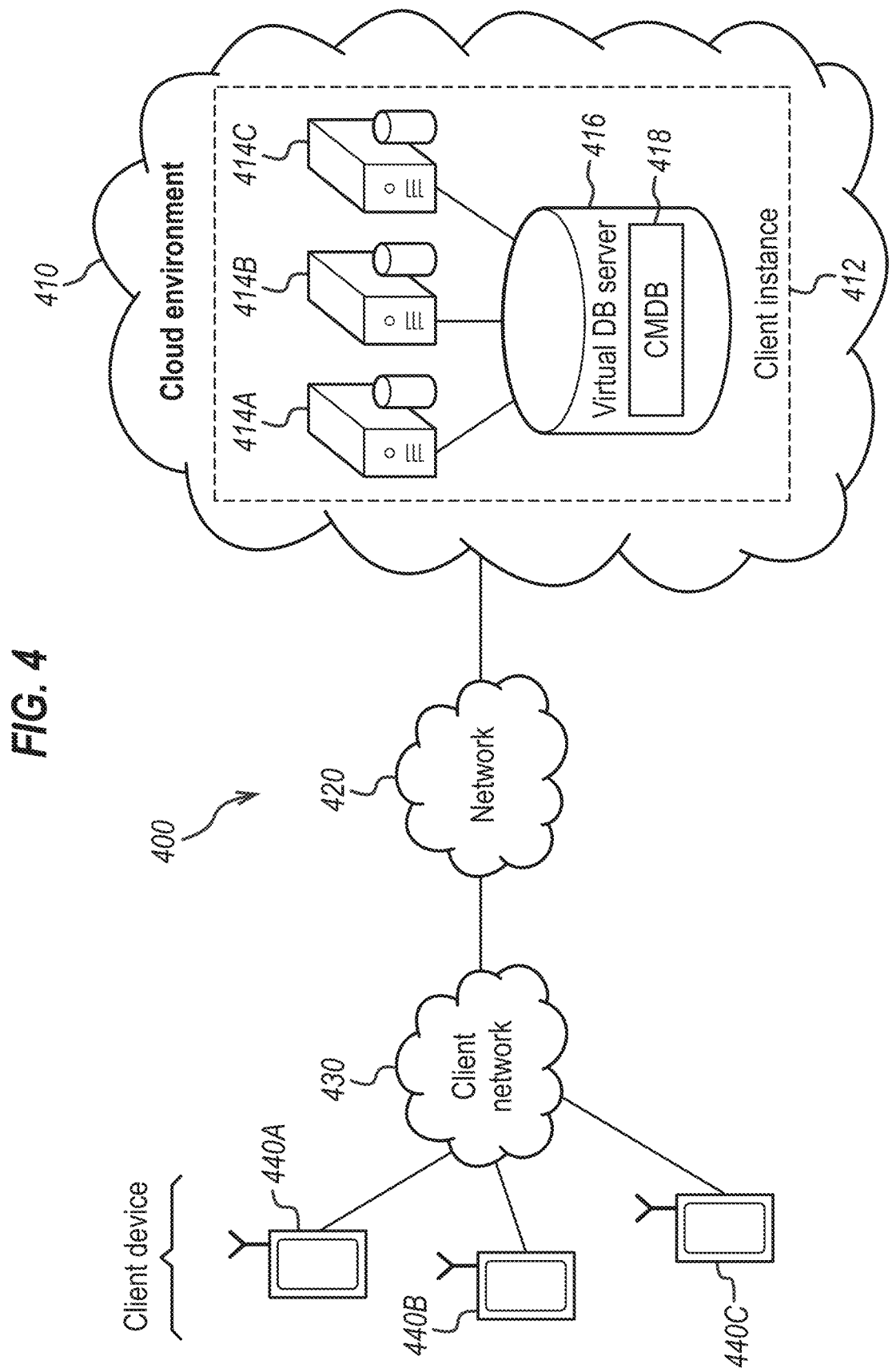
FIG. 4 is a schematic diagram illustrating a cloud computing environment system in which embodiments of the present disclosure may operate.

FIG. 4 is a schematic diagram illustrating a cloud computing environment system in which the embodiments of the present disclosure may operate. The cloud computing environment system may comprise the system as illustrated and described with reference to FIG. 3, and computer hardware that is configured to implement the cloud computing environment system, the system as described in FIG. 3, or the methods described herein.

As shown in FIG. 4, the cloud computing environment system 400 comprises a cloud environment 410 communicatively coupled via a network 420 to a client network 430. As explained in more detail below, the cloud environment 410 of the present embodiments hosts host a configuration management database (CMDB) platform. The client network 430 may be a local private network, such as local area network (LAN) having a variety of network devices that include, but are not limited to, switches, servers, and routers. Also, the client network 430 may represent an enterprise network that could include one or more LANs, virtual networks, data centres, and/or other remote networks.

As shown in FIG. 4, the client network 430 is able to connect to one or more client devices 440A, 440B, 440C so that the client devices are able to communicate with each other and/or with the cloud environment 410. The client devices 440A, 440B, 440C may be computing systems and/or other types of computer devices generally referred to as Internet of Things (IoT) devices that access cloud computing services, for example, via a web browser application or via an edge device (not shown in the diagram) that may act as a gateway between the client devices 440A, 440B, 440C and the cloud environment 410.

Furthermore, although not shown in FIG. 4, the client network 430 may include an administration or managerial device or server that may facilitate communication of data between the cloud environment 410, other external applications, data source, and services, and the client network 430. Also, although not shown in FIG. 4, the client network 430 may also include a connecting device (e.g. a gateway or a router) or a combination of devices that implement a firewall or similar intrusion protection mechanism.

The network 420 may include one or more computing networks, such as LANs, wide area networks (WANs), the Internet, and/or other remote networks, to transfer data between the client devices 440A, 440B, 440C, and the cloud environment 410. The network 420 may include wireless networks such as cellular networks or other suitable radio-based networks. The network 420 may also employ network communication protocols, such as Transmission Control Protocol (TCP) and Internet Protocol (IP). Although not shown in FIG. 4, the network 420 may include a number of network devices, such as servers, routers, network switches, and/or other network hardware devices configured to transport data over the network 420. The network 420 may utilise encryption (e.g. Secure Sockets Layer) to secure data being transferred over the network 420 to the cloud computing environment system 400.

The cloud environment 410 may be a remote network that is able to communicate the client devices 440A, 440B, 440C via the client network 430 and the network 420. The cloud environment 410 may provide additional computing resource to the client devices 440A, 440B, 440C and/or the client network 430. For example, by utilising the cloud environment 410, users of the client devices 440A, 440B, 440C are able to build and execute applications for various enterprise, IT, and/or other organisation-related functions.

In the illustrated embodiment, the cloud environment 410 may be implemented on one or more virtual servers 414A, 414B, 414C (which may be referred to as application nodes, application servers, virtual server instances, application instances, or application server instances). Each of the one or more virtual servers 414A, 414B, 414C may be part of a data centre (not shown in the drawing), where a data centre may correspond to a respective geographical location. Each virtual server 414A, 414B, 414C can be implemented on a physical computing system, such as a single electronic computing device (e.g. a single physical hardware server) or across multiple computing devices (e.g. multiple physical hardware servers). Each virtual server 414A, 414B, 414C may be a web server, an application, and/or a database server.

According to the present disclosure, the virtual servers 414A, 414B, 414C and a dedicated database server, i.e. virtual database server 416, support and enable a client instance 412. In other words, the virtual servers 414A, 414B, 414C and the virtual database server 416 are not shared with other client instances and are specific to the respective client instance 412. In more detail, the virtual servers 414A, 414B, 414C support and enable the client instance 412 as part of a configuration management database (CMDB) 418. The virtual servers 414A, 414B, 414C may host or store a number of network graphs which can be regularly updated from database tables that are stored separately (e.g. at a third party storage), the database tables storing information relating to the operation of the CMDB 418. The cloud environment 410 is connected to the client devices 440A, 440B, 440C via the network 420 and the client network 430 to provide a user interface to network applications executing within the client instance 412 (e.g. via a web browser of the client device).

Although it is explained above that the virtual servers 414A, 414B, 414C may be part of a data centre, in some implementations the virtual servers 414A, 414B, 414C and the virtual database server 416 may be allocated to multiple data centres so that at least one of the data centres acts as a backup data centre.

The cloud environment 410 can host computer executable code which is executed in the cloud environment 410 in response to a request from a client device 440A, 440B, 440C. Execution of the computer executable code causes data to be processed, and the output data produced by executing the computer executable code is available to be accessed via the client device 440A, 440B, 440C. In this way, the computer resources required for data processing are outsourced from the client device 440A, 440B, 440C to the cloud environment 410. This is advantageous because it means that a user does not have to provision and maintain their own physical computer hardware. Moreover, a user can send the request from anywhere, as long as they have connection to cloud environment 410 via network 420 and a client device 440A, 440B, 440C. Since the network 420 is typically the Internet, which is ubiquitous, the accessibility of cloud environment 410 to a client device 440A, 440B, 440C is extremely high. This is convenient as the user does not have to be physically present at a particular location in order to access cloud environment 410. A user of the cloud environment 410 may additionally or alternatively develop computer executable code for execution in the cloud environment 410. The user can access computer executable code in cloud environment 410 through a web browser or any other appropriate client application residing on a client computer.

When executed, the computer executable code may process data or use data. This data is made available to the cloud environment 410 by including particular services in the computer executable code such as access to REST (Representational State Transfer) APIs (Application Programming Interface) or similar communication protocols. REST APIs work by making HTTP requests to GET, PUT, POST and DELETE data. Thus, when the computer executable code makes a request for data, it may do so by making a HTTP GET request to the data source. Such services (and therefore data) may be provided either internally within the cloud environment 410, or externally by one or more external providers.

Although not illustrated in FIG. 4, the cloud environment 410 may comprise cloud environment hardware that can be invoked to instantiate data processing, data storage, or other computer resources using cloud computing hardware for a limited or defined duration. The cloud environment hardware may comprise one or more servers, and a storage array network, as well as any other suitable hardware.

Figure 5:
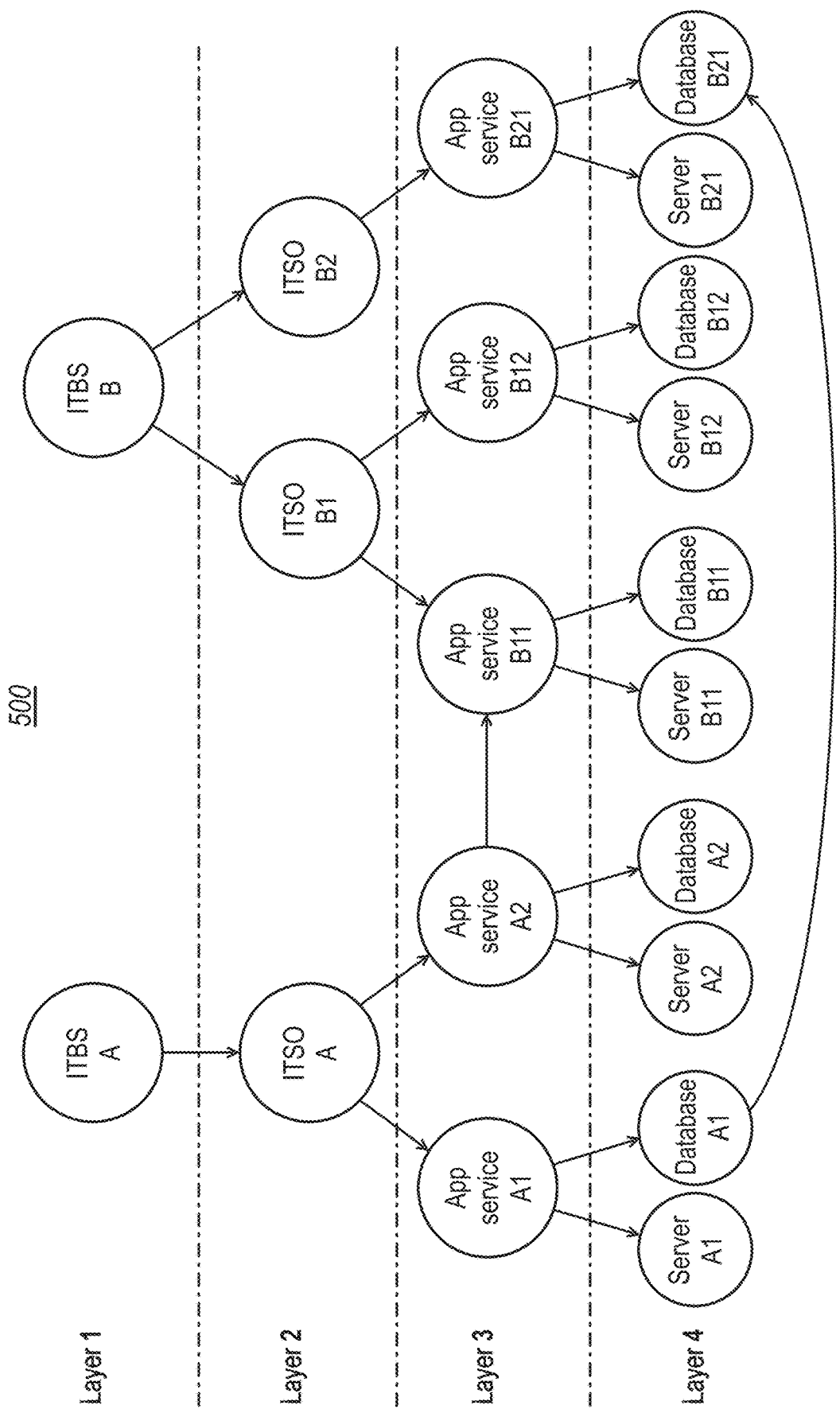
FIG. 5 is a schematic diagram illustrating a structure of exemplary original network data representing a configuration management database, according to the present disclosure.

FIG. 5 is a schematic diagram illustrating a structure of exemplary original network data representing a configuration management database, according to the present disclosure.

As shown in FIG. 5, the original network data 500 is structured with data comprising a plurality of nodes and a plurality of edges. Each of the plurality of nodes represents a respective configuration item, and each of the plurality of edges (which are represented as arrows) between the nodes represent a relationship between two configuration items represented by respective nodes. As explained above, a relationship between configuration items may be at least one of: a parent-child relationship, a dependency relationship, an association relationship, and a triggering relationship. In the present embodiment, the parent-child relationships are represented by arrows between nodes in different hierarchical layers, as will be explained in more detail below.

In the present embodiment, the plurality of configuration items represented by the nodes in the structure include a first IT business suite module (represented by the node "ITBS A") and a second IT business suite module (represented by the node "ITBS B"). ITBS A includes a child node "ITSO A" which represents a first IT service operations module. Furthermore, ITSO A includes two child nodes which represent a first app service module (i.e. node "App Service A1") and a second app service module (i.e. node "App Service A2"). App Service A1 and App Service A2 each includes two further child nodes, which represent a server and a database corresponding to the respective App Service module. These nodes are referred to as "Server A1", "Database A1", "Server A2", and "Database A2".

ITBS B includes two child nodes "ITSO B1" and "ITSO B2" which respectively represent a second IT service operations module and a third IT service operations module. ITSO B1 includes two child nodes which represent a third app service module (i.e. node "App Service B11") and a fourth app service module (i.e. node "App Service B12"). ITSO B2 includes one child node which represents a fifth app service module (i.e. node "App Service B21"). App Service B11, App Service B12, and App Service B21 each includes two further child nodes, which represent a server and a database corresponding to the respective app service module. These nodes are referred to as "Server B11", "Database B11", "Server B12", "Database B12", "Server B21", and "Database B21".

The plurality of nodes in the structure of the original network data 500 each belong to one of the hierarchical layers (i.e. layer 1, layer 2, layer 3, layer 4), where each hierarchical layer corresponds to a category of CI. Specifically, ITBS A and ITBS B belong to layer 1. ITSO A, ITSO B1, and ITSO B2 belong to layer 2. App Service A1, App Service A2, App Service B11, App Service B12, and App Service B21 belong to layer 3. Server A1, Database A1, Server A2, Database A2, Server B11, Database B11, Server B12, Database B12, Server B21, and Database B21 belong to layer 4. Thus, the categories of CI in the present embodiment are "IT business suite module", "IT service operations module", "app service modules", and "servers/databases".

In the present embodiment, except for layer 1, nodes belonging to a layer are child nodes of a preceding layer (i.e. upper layer). For example, the nodes belonging to layer 2 are child nodes of nodes in layer 1. The parent-child relationships between configuration items (which are represented by respective nodes) are denoted by the arrows between nodes in the different layer as illustrated in FIG. 5. Furthermore, the second and third app services modules are related (e.g. a triggering relationship), as demonstrated by an arrow between the two respective nodes App Service A2 and App Service B11. The databases of the first app service module and of the fifth app service module are also related (e.g. an association relationship), as demonstrated by an arrow between the two respective nodes Database A1 and Database B21.

Figure 6A:
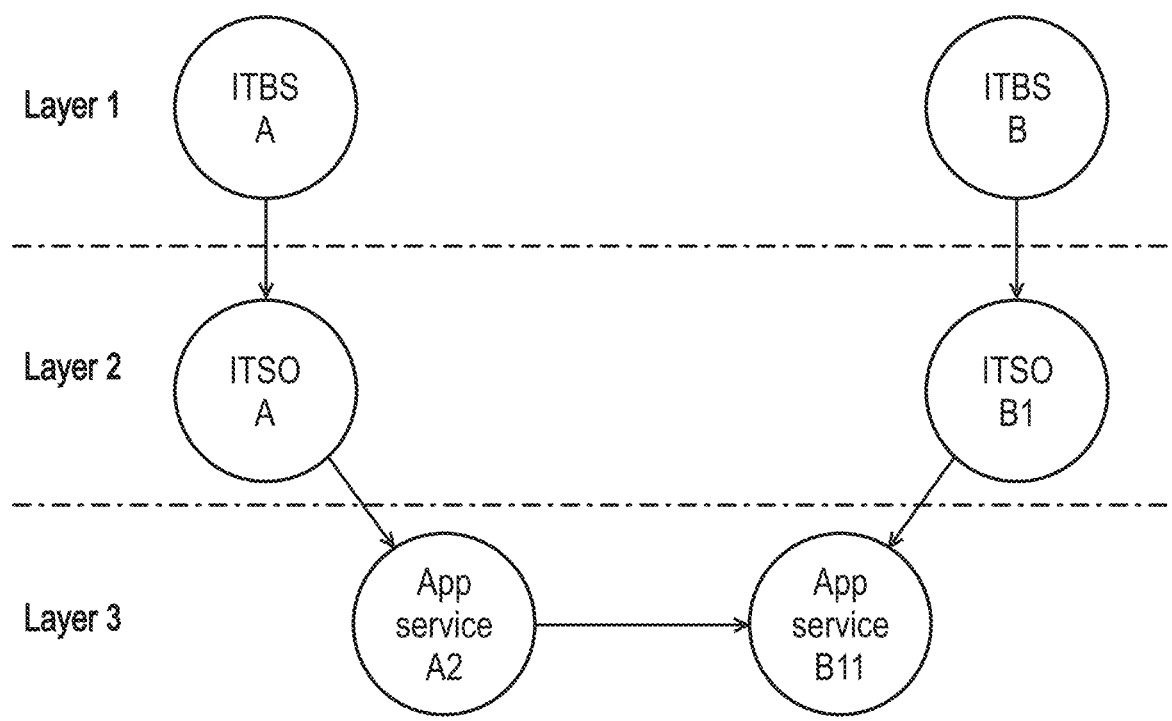
FIG. 6A is a schematic diagram illustrating an indirect connection between two nodes in a first hierarchical layer in the structure of the exemplary original network data of FIG. 5.
Figure 6B:
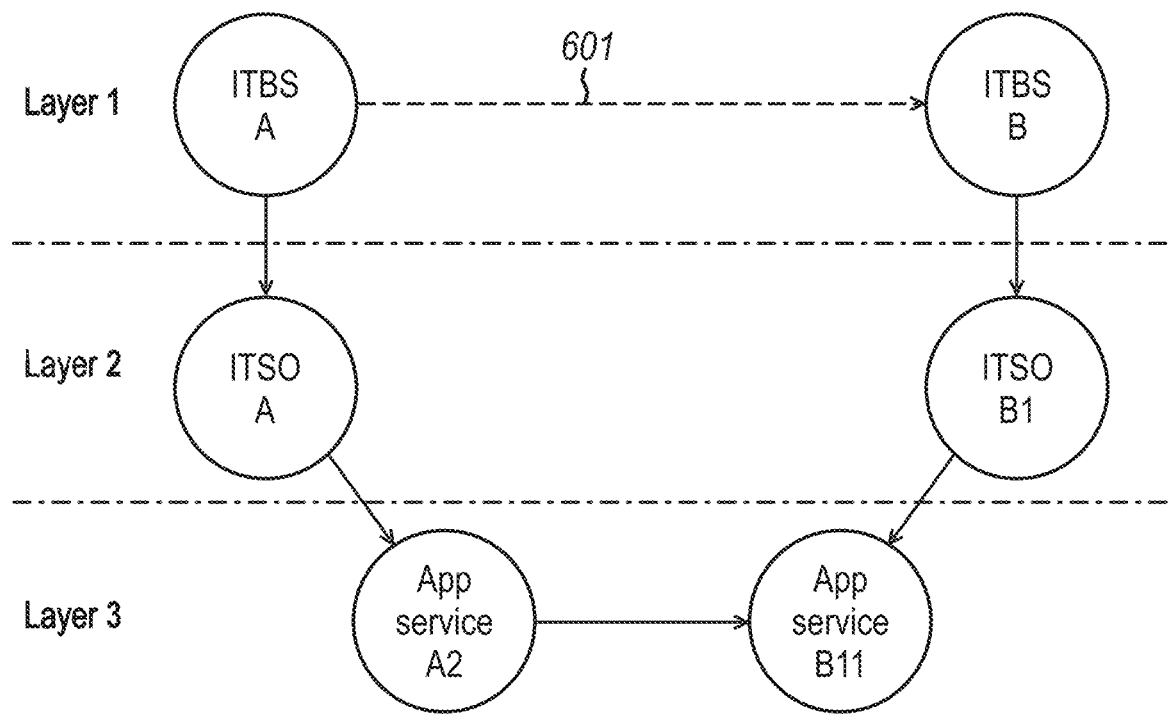
FIG. 6B is a schematic diagram illustrating a condensed edge established between two identified nodes in the first hierarchical layer in the structure of the exemplary original network data of FIG. 5.
Figure 7A:
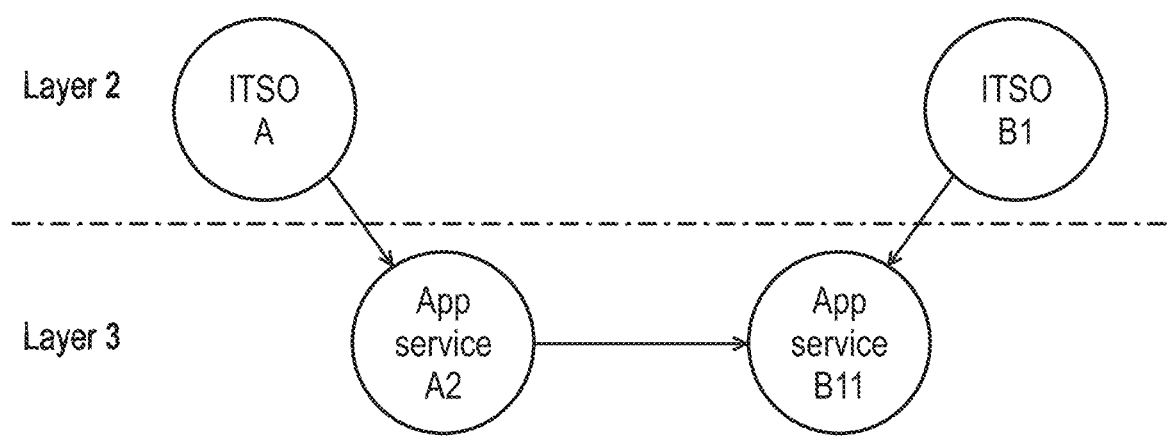
FIG. 7A is a schematic diagram illustrating an indirect connection between two nodes in a second hierarchical layer in the structure of the exemplary original network data of FIG. 5.
Figure 7B:
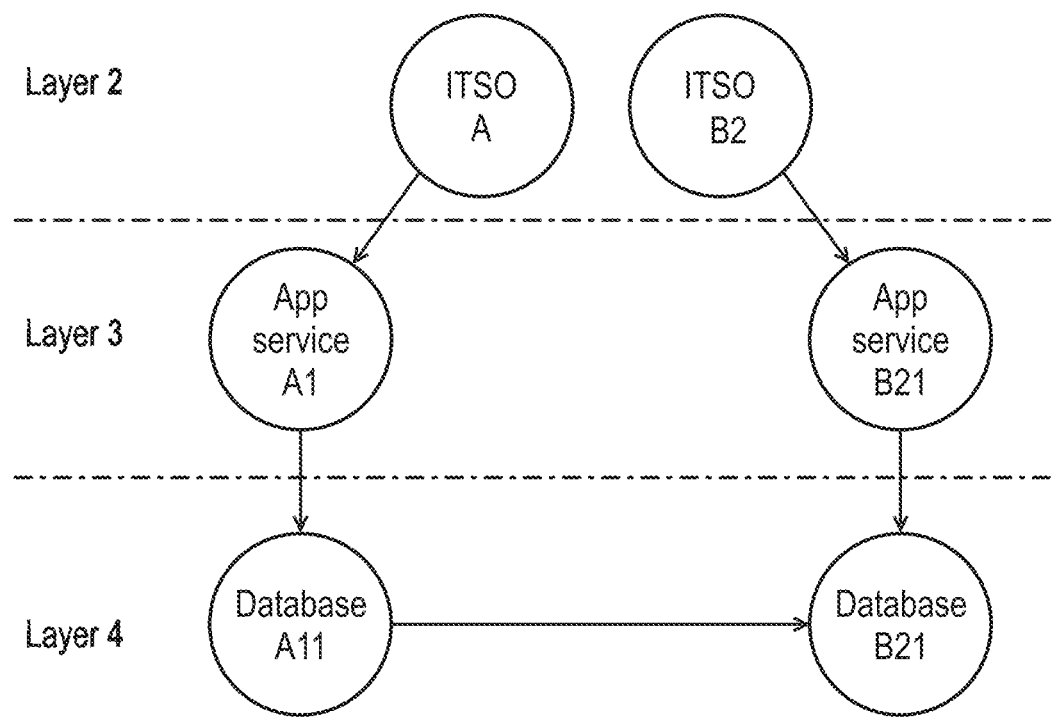
FIG. 7B is a schematic diagram illustrating another indirect connection between two nodes in the second hierarchical layer in the structure of the exemplary original network data of FIG. 5.
Figure 7C:
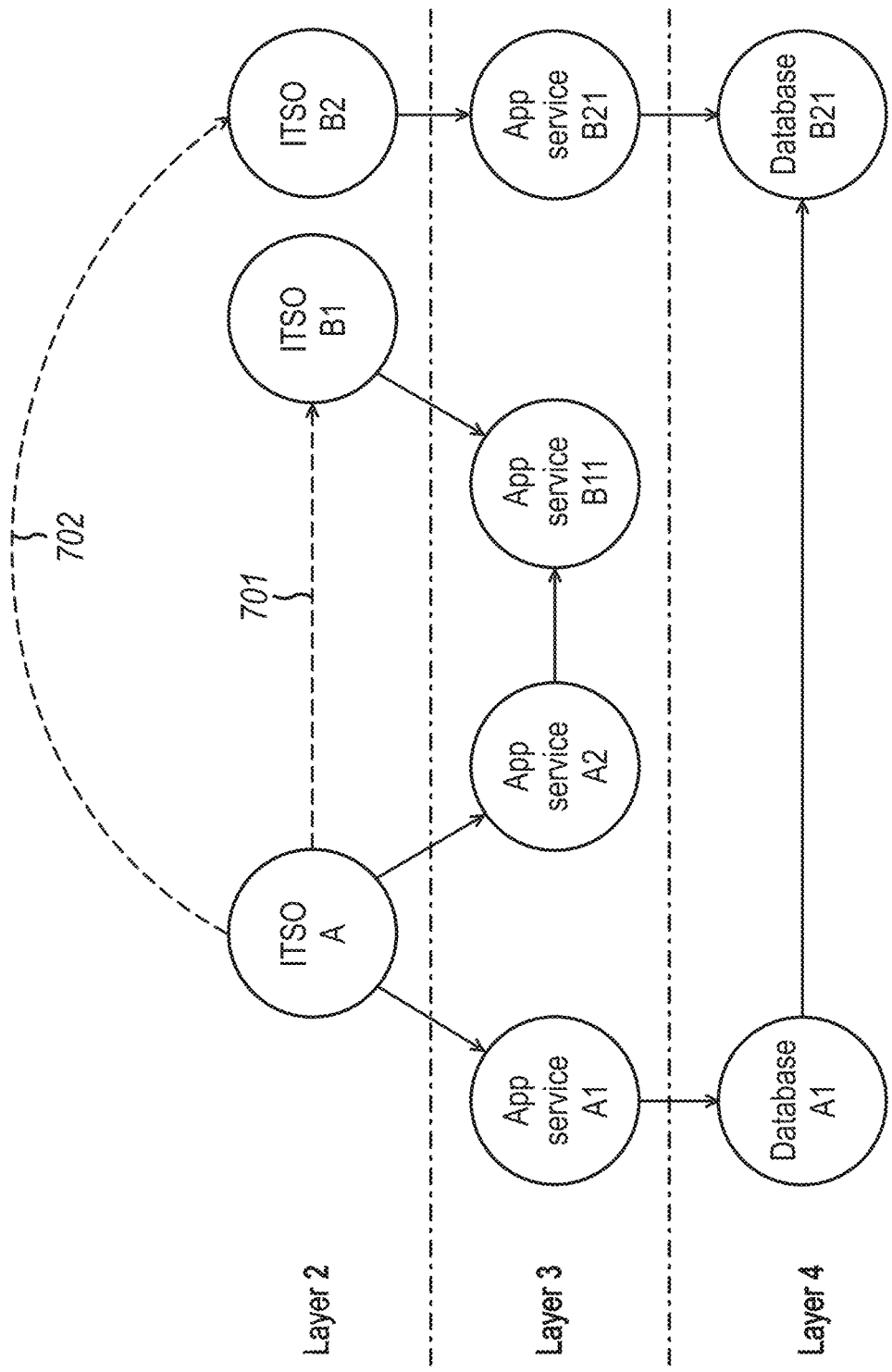
FIG. 7C is a schematic diagram illustrating respective condensed edges established between pairs of identified nodes in the second hierarchical layer in the structure of the exemplary original network data of FIG. 5.
Figure 8A:
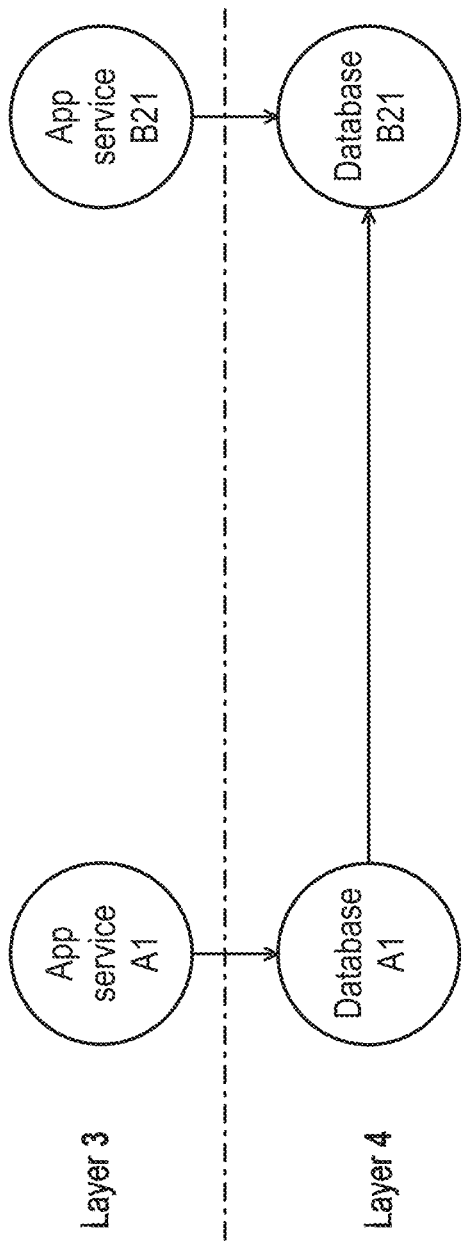
FIG. 8A is a schematic diagram illustrating an indirect connection between two nodes in a third hierarchical layer in the structure of the exemplary original network data of FIG. 5.
Figure 8B:
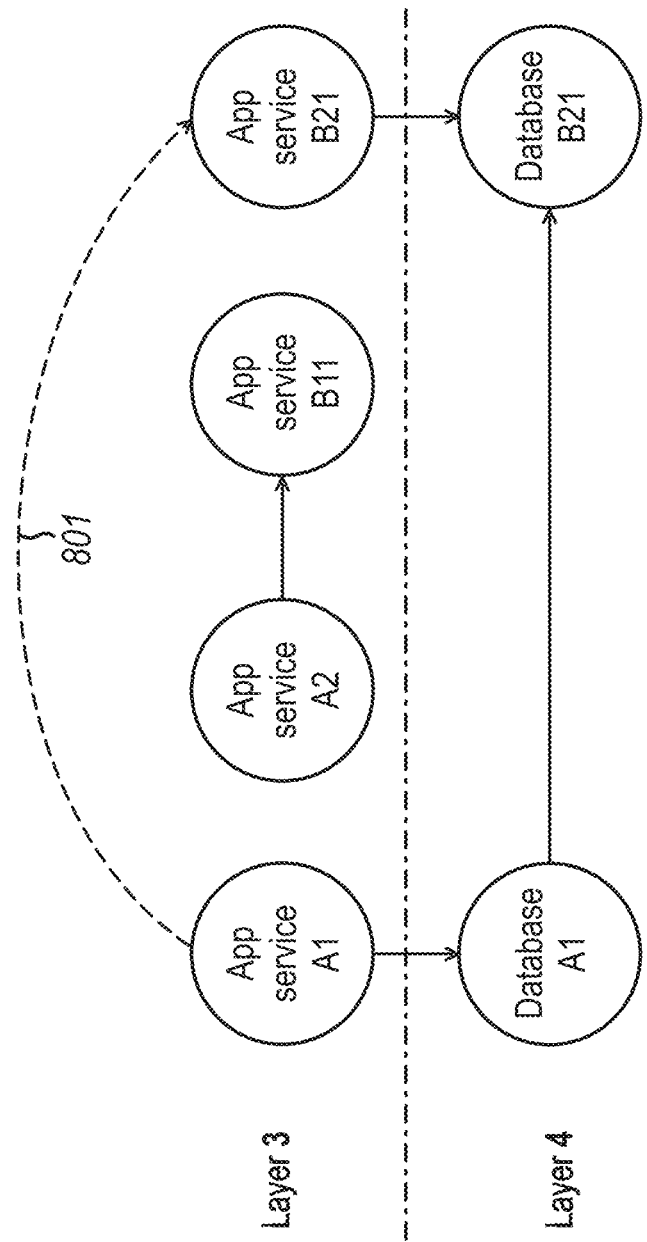
FIG. 8B is a schematic diagram illustrating a condensed edge established between two identified nodes in the third hierarchical layer in the structure of the exemplary original network data of FIG. 5.

It can be seen from FIG. 5 that the structure of the original network data 500 contains a number of indirect connections between a number of nodes. These are explained in more detail with reference to FIGS. 6A-B, FIGS. 7A-C, and FIGS. 8A-B. More specifically, FIGS. 6A and 6B show an indirect connection between two nodes in layer 1 and establishment of a condensed edge between the nodes. FIGS. 7A, 7B, and 7C show indirect connections between two pairs of nodes in layer 2 and establishment of respective condensed edges between the nodes. FIG. 8A and FIG. 8B show an indirect connection between two nodes in layer 3 and establishment of a condensed edges between the nodes. As mentioned above, the establishment of condensed edges may be performed in response to a request to condense the network data at a corresponding hierarchical layer. It is noted that these diagrams only illustrate some of the nodes and edges of the structure of the original network data 500 concerned with each certain indirect connection rather than the whole structure.

FIG. 6A illustrates the indirect connection between the nodes representing the first IT business suite module ("ITBS A") and the second IT business suite module ("ITBS B"). As shown in the diagram, the two nodes representative of these CIs are indirectly connected via four other nodes ITSO A, App Service A2, App Service B11, and ITSO B1 and the edges associated with these four other nodes. By performing the method 100, 200 as described herein or through use of the system 300 as described herein, the two nodes ITBS A and ITBS B can be identified as having an indirect connection, and subsequently a condensed edge can be established between the two nodes in the network data, as denoted by the dotted arrow 601 in FIG. 6B.

Similarly, FIG. 7A illustrates the indirect connection between the nodes representing the first IT service operations module ("ITSO A") and the second IT service operations module ("ITSO B1"). As shown in the diagram, the two nodes representative of these CIs are indirectly connected via two other nodes App Service A2 and App Service B11 and the edges associated with these two other nodes. FIG. 7B illustrates another indirect connection between the nodes representing the first IT service operations module ("ITSO A") and the third IT service operations module ("ITSO B2"). As shown in the diagram, the two nodes representative of these CIs are indirectly connected via four other nodes App Services A1, Database A1, Database B21, and App Service B21, and the edges associated with these four other nodes. By performing the method as described herein or through use of the system 300 as described herein, ITSO A and ITSO B1 can be identified as having an indirect connection, and ITSO A and ITSO B2 can also be identified as having an indirect connection. Subsequently, respective condensed edges can be established between ITSO A and ITSO B1 (as denoted by the dotted arrow 701 in FIG. 7C) and between ITSO A and ITSO B2 (as denoted by the dotted arrow 702 in FIG. 7C).

Similarly, FIG. 8A illustrates the indirect connection between the nodes representing the first app service module ("App Service A1") and the fifth app service module ("App Service B21"). As shown in the diagram, the two nodes representative of these CIs are indirectly connected via two other nodes Database A1 and Database B21, and the edges associated with these two other nodes. By performing the method 100, 200 as described herein or through use of the system 300 as described herein, the two nodes App Service A1 and App Service B21 can be identified as having an indirect connection, and subsequently a condensed edge can be established between the two nodes in the network data, as denoted by the dotted arrow 801 in FIG. 8B.

Figure 9:
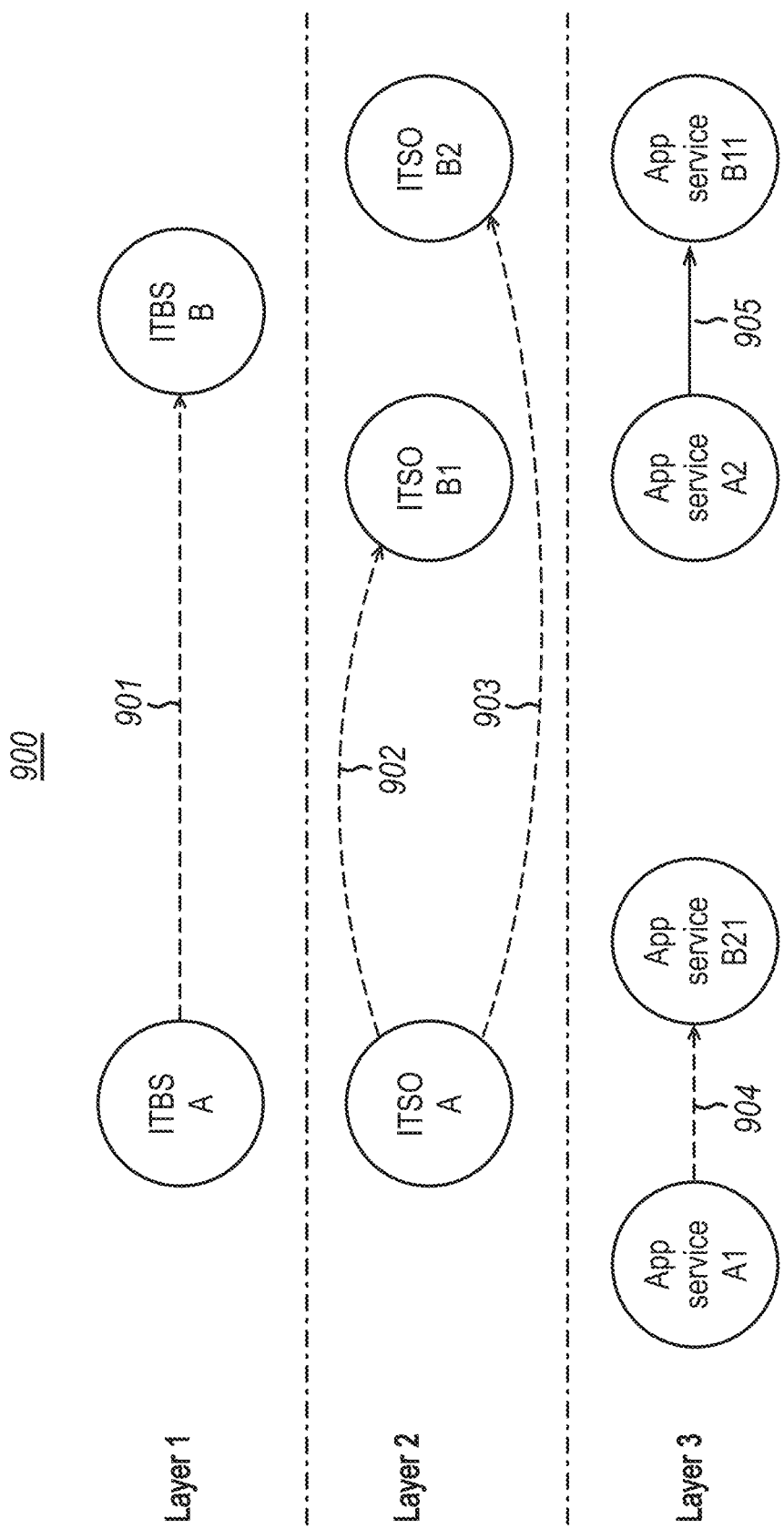
FIG. 9 is a schematic diagram illustrating exemplary condensed network data representing a configuration management database, according to the present disclosure.

FIG. 9 is a schematic diagram illustrating exemplary condensed network data representing a configuration management database, according to the present disclosure.

In the present embodiment, the condensed network data 900 is generated on the basis of the original network data 500 as illustrated in FIG. 5, having undergone the process of identifying nodes that are indirectly connected and establishing condensed edges to directly connect the identified nodes as described with reference to FIGS. 6A-B, FIGS. 7A-C, and FIG. 8A-B. The condensed network data 900 may be regarded as equivalent to the "second network data" that is generated as an outcome of the method 200 as illustrated in FIG. 2.

As shown in FIG. 9, the condensed network data 900 is structured with data comprising a plurality of nodes and a plurality of edges. The plurality of nodes in the structure correspond to a portion of the plurality of nodes of the original network data 500. The plurality of configuration items represented by the nodes in the structure include the first IT business suite module (represented by the node "ITBS A") and the second IT business suite module (represented by the node "ITBS B") in layer 1, the first, second, a third IT service operations modules (represented by the nodes "ITSO A", "ITSO B1" and "ITSO B2") in layer 2, and the first app service module, the second app service module, the third app service module, and the fifth app service module (represented by the nodes "App Service A1", "App Service A2", "App Service B11", and "App Service B21") in layer 3.

Most of the plurality of edges in the structure correspond to the condensed edges established between nodes as shown in FIG. 6B, FIG. 7C, and FIG. 8B. Specifically, the condensed edge 901 between ITBS A and ITBS B corresponds to the condensed edge 301 of FIG. 6B, the condensed edge 902 between ITSO A and ITSO B1 corresponds to the condensed edge 701 of FIG. 7C, the condensed edge 903 between ITSO A and ITSO B2 corresponds to the condensed edge 702 of FIG. 7C, and the condensed edge 904 between App Service A1 and App Service B21 corresponds to the condensed edge 801 of FIG. 8B. Furthermore, App Service A2 and App Service B11 are also directly connected in the condensed network data 900 by an "existing" edge (labelled in FIG. 9 as 905) that was present in the structure of the original network data 500, since this edge directly connects the two respective nodes and thus would be regarded as potentially useful in the condensed network data 900.

As explained in detail above, a condensed network data structure such as the example illustrated in FIG. 9 enables more efficient and effective interrogation of the configuration management database to be performed. Specifically, the interrogation (e.g. in the form of a database query) can involve traversing direct connections that are established between the identified nodes instead of the indirect connections, which means a shorter path of traversal and in turn reduces the time and computer resources required to perform the interrogation.

It will be appreciated that embodiments described herein may be implemented using a variety of different computing systems. In particular, although the figures and the discussion thereof provide exemplary methods and systems, these are presented merely to provide a useful reference in discussion various aspects of the invention. It will be appreciated that the boundaries between logic blocks in a block diagram are merely illustrative and that alternative embodiments may merge logic blocks or elements, or may impose an alternative decomposition of functionality upon various logic blocks or elements.

It will be appreciated the above-mentioned functionalities may be implemented as one or more corresponding software modules or components. Method steps implemented in flow diagrams herein, or as described above, may each be implemented by corresponding respective modules; multiple method steps implemented in flow diagrams contained herein, or as described above, may together be implemented by a single module.

It is to be understood that some features of the exemplary embodiments that are described as optional may or may not be part of the claimed invention and features of the disclosed embodiments may be combined. Unless specifically set forth herein, the terms "a", "an", and "the" are not limited to one element but instead should be read as meaning "at least one".

It is to be understood that at least some of the figures and descriptions of the invention have been simplified to focus on elements that are relevant for a clear understanding of the invention, while eliminating, for purpose of clarity, other elements that those of ordinary skill in the art will appreciate may also comprise a portion of the invention. However, because such elements are well known in the art, and because they do not necessarily facilitate a better understanding of the invention, a description of such elements is not provided herein. Furthermore, to the extent that the method does not rely on the particular order of steps set forth herein, the particular order of the steps should not be construed as limitation on the claims.

It will be appreciated that, insofar as embodiments of the invention are implemented by software (or a computer program), then a computer-readable storage medium carrying the computer program may form aspects of the invention. The computer program may have one or more program instructions, or program code, which, when executed by a processor, carries out an embodiment of the invention. The term "program" or "software" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution for execution on a computer system. The storage medium may be magnetic disc, an optical disc, or a memory (e.g. a ROM, a RAM, EEPROM, EPROM, flash memory or a portable/removable memory device), etc. The transmission medium may be communications signal, a data broadcast, a communications link between two or more computers, etc.

The invention claimed is:

1. A computer-implemented method for processing configuration management database data, the method comprising:
  i) acquiring first network data, wherein the first network data represents a configuration management database, and wherein the first network data is structured with data comprising:
    a plurality of nodes, each node representing a configuration item of a plurality of configuration items in the configuration management database; and
    a plurality of edges connecting the plurality of nodes, each edge representing a relationship between two configuration items represented by the nodes connected by the respective edge;
  ii) identifying, from the plurality of nodes, a first node and a second node that are connected indirectly via one or more additional nodes and edges associated with the one or more additional nodes; and
  iii) establishing, in the first network data, a first condensed edge between the first node and the second node, wherein the first condensed edge connects directly the first node and the second node.

2. The method of claim 1, wherein the first network data is further structured with a plurality of hierarchical layers, wherein each of the plurality of hierarchical layers represents a category of configuration item, and wherein each of the plurality of nodes belong to a layer of the plurality of hierarchical layers.

3. The method of claim 2, wherein the plurality of hierarchical layers comprise a first layer and a second layer, wherein the one or more additional nodes comprise a third node and a fourth node, wherein the first node and the second node belong to the first layer, and wherein the third node and the fourth node belong to the second layer.

4. The method of claim 3, wherein nodes in the second layer are child nodes of nodes in the first layer.

5. The method of claim 4, wherein the plurality of hierarchical layers further comprises a third layer, wherein the nodes in the third layer are child nodes of nodes in the second layer.

6. The method of claim 4, wherein the plurality of hierarchical layers further comprises a third layer, wherein the nodes in the third layer are parent nodes of nodes in the first layer.

7. The method of claim 3, further comprising receiving a request to condense the first network data at the first layer, wherein steps ii) and iii) are performed in response to receiving the request to condense the first network data at the first layer.

8. The method of claim 1, further comprising receiving a request to determine a shortest path between the first and second nodes, wherein identifying the first node and the second node comprises determining that the first node and the second node are connected indirectly in response to a receiving the request to determine a shortest path between the first and second nodes, optionally wherein the request is received via a user interface.

9. The method of claim 1, further comprising flagging the first condensed edge with a flag indicating that the first condensed edge is to be preferred to any other edge in the first network data.

10. The method of claim 1, further comprising subsequent to establishing the first condensed edge:

identifying one or more pairs of nodes from the plurality of nodes in the first network data, wherein the one or more pairs of nodes each include two nodes that are connected indirectly via one or more additional nodes and edges associated with the one or more additional nodes; and establishing, in the first network data, a condensed edge between the two respective nodes for each identified pair of nodes, wherein the condensed edge connects directly the two respective nodes.

11. The method of claim 1, further comprising, subsequent to establishing the first condensed edge:

generating second network data representative of the configuration management database, wherein the second network data is structured with data comprising the first node, the second node, and the first condensed edge, and wherein the first node and the second node are only connected by the first condensed edge in the second network data.

12. The method of claim 1, further comprising, subsequent to establishing the first condensed edge:

receiving a request to query the configuration management database, optionally via a user interface;

querying the configuration management database by traversing network data representing the configuration management database; and outputting a result of the query.

13. The method of claim 12, further comprising, subsequent to establishing the first condensed edge:

generating second network data representative of the configuration management database, wherein the second network data is structured with data comprising the first node, the second node, and the first condensed edge, and wherein the first node and the second node are only connected by the first condensed edge in the second network data, wherein traversing network data representing the configuration management database comprises traversing at least one of the first network data and the second network data.

14. The method of claim 12, further comprising flagging the first condensed edge with a flag indicating that the first condensed edge is to be preferred to any other edge in the first network data, wherein querying the configuration management database comprises traversing at least the first network data, and wherein traversing the first network data comprises traversing the flagged first condensed edge in preference to other edges in the first network data.

15. The method of claim 12, wherein the request to query the configuration management database is one of:

a request to identify the fewest number of edges between two given nodes;

a request to determine whether at least one given node is directly or indirectly connected to a different given node;

a request to determine whether a particular relationship type exists between two given nodes;

a request to identify one or more nodes which are directly or indirectly connected to both of two different given nodes;

a request to identify and list, optionally in order, the nodes having the greatest number of edges;

a request to identify one or more nodes with a number of edges exceeding a threshold; and a request to identify all nodes directly or indirectly connected to a given node.

16. The method of claim 12, wherein the result comprises the nodes and edges relevant to the query, and the result is output as at least one of: a graph representation, a force-directed graph drawing, a matrix representation, a radial tree diagram, and a table.

17. The method of claim 1, wherein the configuration management database represents a distributed computing infrastructure.

18. The method of claim 17, wherein a relationship between two configuration items represents an operational link between two components of the distributed computing infrastructure, optionally wherein a relationship between two configuration items comprises at least one of: stored on, stores, hosted on, hosts, connects to, connected by, contains, contained by, defines resources for, gets resources from, depends on, used by, manages, managed by, members, member of, owns, owned by, runs on, runs, one-way data transfer, two-way data transfer, API call to, and API calls.

19. The method of claim 17, wherein each configuration item is configurable data representative of one of: a hardware item, a software item, a network, a document, and a computerised service.

20. A system for processing configuration management database data, the system comprising:

at least one computer processor configured to:

acquire first network data, wherein the first network data represents a configuration management database, and wherein the first network data is structured with data comprising:

a plurality of nodes, each node representing a configuration item of a plurality of configuration items in the configuration management database; and a plurality of edges connecting the plurality of nodes, each edge representing a relationship between two configuration items represented by the nodes connected by the respective edge, identify, from the plurality of nodes, a first node and a second node that are connected indirectly via one or more additional nodes and edges associated with the one or more additional nodes; and establish, in the first network data, a first condensed edge between the first node and the second node, wherein the first condensed edge connects directly the first node and the second node; and at least one memory, coupled to the at least one computer processor, configured to provide the at least one computer processor with instructions.

* * * * *